United States Patent [19]

Usui

[11] Patent Number: 5,141,264
[45] Date of Patent: Aug. 25, 1992

[54] CONNECTOR FOR CONNECTING THIN TUBE

[75] Inventor: Masayoshi Usui, Numazu, Japan

[73] Assignee: Usui Kokusai Sangyo Kaisha Ltd., Japan

[21] Appl. No.: 671,008

[22] Filed: Mar. 18, 1991

[30] Foreign Application Priority Data

Mar. 19, 1990 [JP] Japan ............... 2-27901[U]
Mar. 28, 1990 [JP] Japan ............... 2-32544[U]

[51] Int. Cl.⁵ .................................. F16L 37/12
[52] U.S. Cl. .................................. 285/319; 285/351; 285/921; 285/906
[58] Field of Search ............... 285/319, 351, 921, 906

[56] References Cited

U.S. PATENT DOCUMENTS

| | | |
|---|---|---|
| 2,892,991 | 6/1959 | Beebee et al. |
| 3,169,030 | 2/1965 | Lippincott |
| 3,453,005 | 7/1969 | Foults |
| 3,826,523 | 7/1974 | Eschbaugh |
| 3,933,378 | 1/1976 | Sandford et al. |
| 4,026,581 | 5/1977 | Pasbrig |
| 4,035,005 | 7/1977 | De Vinent et al. |
| 4,074,912 | 2/1978 | Van Bilderbeek et al. |
| 4,219,222 | 8/1980 | Brusadin |
| 4,275,907 | 6/1981 | Hunt |
| 4,451,069 | 5/1984 | Melone |
| 4,541,658 | 9/1985 | Bartholomew .................... 285/319 |
| 4,601,497 | 7/1986 | Bartholomew |
| 4,637,636 | 1/1987 | Guest |
| 4,637,640 | 1/1987 | Fournier et al. |
| 4,673,199 | 6/1987 | Renfrew |
| 4,681,351 | 7/1987 | Bartholomew .................... 285/319 |
| 4,749,214 | 6/1988 | Hoskins et al. ................ 285/319 X |
| 4,753,458 | 6/1988 | Case et al. |
| 4,776,616 | 10/1988 | Umehara et al. |
| 4,778,203 | 10/1988 | Bartholomew |
| 4,781,400 | 11/1988 | Cunningham |
| 4,793,637 | 12/1988 | Laipply et al. |
| 4,895,396 | 1/1990 | Washizu |
| 4,913,467 | 4/1990 | Washizu |
| 4,915,420 | 4/1990 | Washizu |
| 4,944,537 | 7/1990 | Usui et al. |
| 4,946,205 | 8/1990 | Washizu |
| 4,948,180 | 8/1990 | Usui et al. |
| 4,964,658 | 10/1990 | Usui et al. |
| 5,002,315 | 3/1991 | Bartholomew .................... 285/319 X |

FOREIGN PATENT DOCUMENTS 593413 5/1959 Italy
855603 12/1960 United Kingdom

Primary Examiner—Dave W. Arola
Attorney, Agent, or Firm—Anthony J. Casella; Gerald E. Hespos

[57] ABSTRACT

There is disclosed a compact and durable connector for connecting a thin tube or pipe which is used as a passage for supplying oil or air to an automobile or machine and whose diameter is less than about 20 mm. The tube has an outwardly swelling annular wall. The connector comprises a connector body and a socket body. The body has a connecting cylindrical wall at its front end. The cylindrical wall has a communication hole. A stepped enlarged chamber is formed in the body. At least one annular seal member is mounted in the chamber. The socket member comprises a cylindrical member pushing the seal member, engaging support claw walls protruding forward, and an inclined cylindrical wall spreading forward. When the tube is connected, the engaging support claw walls engage with the swelling annular wall of the tube.

15 Claims, 4 Drawing Sheets

CONNECTOR FOR CONNECTING THIN TUBE

BACKGROUND OF THE INVENTION

1. Field of the Invention

The present invention generally relates to improvements in a connector for connecting a relatively thin metallic or resinous tube or pipe whose diameter is less than about 20 mm and which is disposed as a passage for supplying oil or air to an automobile or any of various machines and apparatuses.

2. Description of the Prior Art

A conventional connector of this kind is shown in FIG. 13, where the body of the connector is indicated by numeral 11. The body 11 comprises a connecting cylindrical wall 12 located around the front end, an engaging support wall 11' formed around the rear end, a communication hole 14 extending through the cylindrical wall 12, an enlarged chamber 13 extending axially through the support wall 11', annular seal members 16 mounted in the body, a bush member 17 mounted in the body. The engaging support wall 11' forms a cylindrical wall connecting with the communication hole 14. A socket member 18 has a plurality of claw walls 15 which protrude forward and inclined forwardly. The socket member 18 further includes an annular stepped peripheral wall portion 18' at its rear end, the peripheral wall portion 18' engaging the engaging support wall 11'. An engaging hole 19 assuming the form of a slot is formed in the cylindrical wall portion forming the enlarged chamber 13 of the body 11. The claw wall portions are disposed in the hole 19. Under this condition, an annular swelling wall $P_o'$ of a tube $P_o$ which is mounted in the enlarged chamber is engaged by the front ends of claw walls 15 to connect the tube.

In the above-described prior art techniques, the stepped peripheral wall 18' of the socket member 18 is brought into engagement with the engaging support wall 11' of the body 11. At the same time, the claw walls 15 of the socket member are placed in the engaging hole 19 formed in the cylindrical wall of the body 11. In this way, the socket member is mounted. Because of this structure, the socket member 18 crushes the peripheral wall portion of an attachment portion 18" formed by the claw walls 15 and passes inside the engaging support wall 11' when the socket member 18 is mounted. At this time, the socket member is pushed from the rear side. Thus, it is inevitable that the socket member 18 itself has a large diameter. In addition, because the socket member is mounted by means of the engaging support walls 11' formed by the cylindrical wall, the whole finished product has a large diameter and is long longitudinally. Hence, difficulties are often created in mounting the structure. Simultaneously, it is necessary to make the diameter of the swelling wall $P_o'$ large, since the long size of the claw walls 15 makes the engagement with the swelling wall $P_o'$ unstable. Also, the force with which the socket member is brought into engagement with the swelling wall $P_o'$ decreases, so that fatigue is produced. When the tube is disposed under vibrating condition, leakage is induced. In this way, the tube cannot be connected stably over a long term. Further, it is difficult to visually check the engagement from the outside, since the claw walls 15 engage the swelling wall $P_o'$ inside the enlarged chamber 13. In this manner, various problems occur.

SUMMARY OF THE INVENTION

It is an object of the invention to provide a connector which is used to connect a thin tube or pipe, is compact to permit the connector to be installed in a narrow space, comprises a short socket member having a small diameter, a small annular swelling wall, and short engaging support claw walls tending to get less fatigued, produces more certain engaging force, permits the connection to be maintained for a long time more reliably, and facilitates visually checking the engagement because of the engagement of the claw walls located outside with the swelling wall.

In a fundamental embodiment of the invention, the connector for connecting a thin tube having an outwardly swelling annular wall formed around the end at which the tube is connected comprises: a connector body having a connecting cylindrical wall around its front end and a stepped enlarged chamber communicating with a Communication hole formed in the cylindrical wall, the enlarged chamber extending axially through the connector body; at least one annular seal member mounted in the enlarged chamber; a socket member having a push member at its front end, engaging support members at its rear end, and a recessed member located at an intermediate location, the push member acting to push the annular seal member, the engaging support members protruding inward, the recessed member engaging with the cylindrical wall of the enlarged chamber near the rear end of the cylindrical wall, the engaging means being connected with the outwardly swelling annular wall of the tube so as to be able to engage with the swelling annular wall when the tube is connected.

In a second embodiment of the invention, the connector for connecting a thin tube having an outwardly swelling annular wall formed around the end at which the tube is connected comprises: a connector body having a connecting cylindrical wall around its front end and a stepped enlarged chamber communicating with a communication hole formed in the cylindrical wall, the enlarged chamber extending axially through the connector body; at least one annular seal member mounted in the enlarged chamber; a cylindrical socket member having a front end portion that pushes the seal member inside the enlarged chamber. The socket member engaging with the vicinities of the rear end of the cylindrical wall formed by the enlarged chamber of the connector body around the front end of the socket member; and a plurality of engaging support members protruding forward and having rear end portions rigidly fixed to the rear portion of the socket member, the engaging support members being capable of connecting with The annular wall portion of the tube inside the socket member so as to be able to engage with the annular wall portion when the tube is connected. The engaging support members consist either of engaging support claw walls formed integrally with a retainer or of engaging support claw walls cast with the socket member or fixed by crimping. The engaging support members are made from a metallic spring material, resin, or a combination thereof. The front end portions of the engaging support claw walls are raised outwardly. The socket member has a front end portion which is either bent inwardly so as to communicate with an opening in a wall or bent outwardly so as to connect with the cylindrical wall. A sleeve is interposed between the cylindrical wall and the outer surface of the tube.

In a third embodiment of the invention, the connector for connecting a thin tube having an outwardly swelling annular wall formed around the end t which the tube is connected comprises: a connector body having a connecting cylindrical wall around its front end and a stepped enlarged chamber communicating with a communication hole formed in the cylindrical wall, the enlarged chamber extending axially through the connector body; at least one annular seal member mounted in the enlarged chamber; and a socket member having a seal wall and a rear portion connecting with the seal wall that pushes the seal member at its front end inside the enlarged chamber, the rear portion having a plurality of engaging support claw walls protruding rearward, the socket member being mounted to the connector body, the socket member further including an engaging wall portion engaging with the cylindrical wall formed by the enlarged chamber near the rear end of the cylindrical wall, the engaging support claw walls of the socket member being capable of connecting with the annular wall portion of the tube inserted in the enlarged chamber so as to be able to engage with the annular wall portion when the tube is connected. The socket member consists either of a cylindrical wall inclined and spreading forward or of a cylindrical wall having jaw walls around its front end. Where two or more annular seal members are mounted, spacers are interposed between these seal members.

Since the novel connector is constructed as described above, the socket member is mounted by previously attaching the intermediate portion of the socket member to the connector body or previously attaching the intermediate portion of the socket member already mounted to the tube to the connector body and then crimping the cylindrical wall formed by the enlarged chamber near the rear end of the cylindrical wall. Therefore, it is easy to mount the socket member and the tube. Furthermore, the diameter and the length of the socket member itself can be reduced. Moreover, the engagement is stable, because the short engaging support claw walls engage with swelling annular wall. This permits the diameter of the swelling wall to be made small. Additionally, the possibility that the support claw walls become fatigued is eliminated. A sufficient engaging force is produced reliably and maintained for a long time. Hence, the connection can be maintained with certainty. Consequently, the whole product including the connector body can be rendered compact and so it can be installed in a narrow space. Further, the outer engagement makes it easy to visually check the validity of the engagement.

The above and other objects and features of the invention will become more apparent in the following description and the accompanying drawings in which like numerals refer to like parts.

DETAILED DESCRIPTION OF THE PREFERRED EMBODIMENTS

Figure 1:
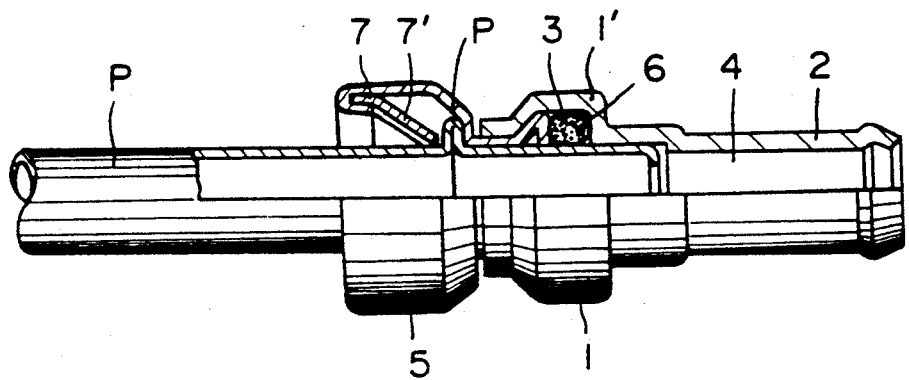
FIG. 1 is a partially cutaway vertical cross section of a connector for connecting a thin tube, the connector being built in accordance with the invention, and in which the connector is connected.

Referring to FIGS. 1-7, the body of a connector according to the invention is indicated by reference numeral 1 and made of a metal. The body 1 has a connecting cylindrical wall 2 on the side of the front end, the wall 2 being adapted for connection with a resinous tube or rubber hose (not shown). The cylindrical wall 2 has a communication hole 4. A stepped enlarged chamber 3 that is in communication with the communication hole 4 extends axially through the body 1. One (FIG. 1) or more (FIG. 4) annular seal members 6 consisting of a resilient material such as rubber are mounted in the enlarged chamber. If necessary, spacers may be interposed between the plural seal members. A cylindrical socket member 5 is made of a metal or resin and located in the enlarged chamber 3. The socket member 5 pushes the seal member or members 6 at its front end. A cylindrical wall 1' forming the enlarged chamber 3 of the body 1 of the connector are crimped at its rear end against the vicinities of the front end of the socket member.

The socket member 5 has a front end portion which is either bent inwardly (FIG. 1) and connects with a spreading wall, or the front end portion is bent outwardly (FIG. 4) and connects with a cylindrical wall, to form sealing surfaces 7''. A retainer 7 fabricated independently has engaging support members consisting of a metal spring member, a resin, or a combination thereof. A plurality of engaging support claw walls 7' protrude forwardly from the retainer 7. The retainer has a rear end portion crimped against or cast with the rear end of the socket member 5.

Figure 2:
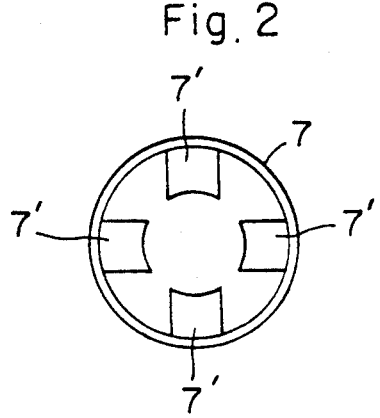
FIG. 2 is a rear view of the engaging support members shown in FIG. 1.
Figure 3:
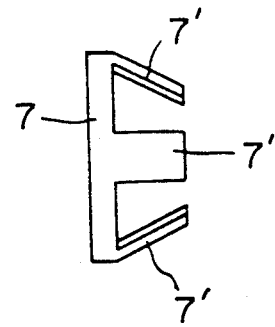
FIG. 3 is a front elevation of the engaging support members shown in FIG. 2.
Figure 5:
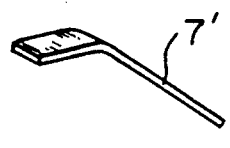
FIG. 5 is a perspective view of another engaging support member consisting of an engaging claw wall.
Figure 6:
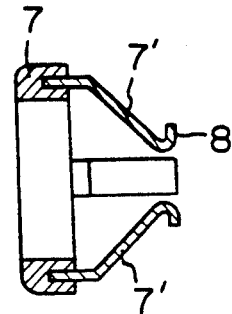
FIG. 6 is a cross section of further engaging support members each consisting of an engaging support claw wall.

The engaging support members are not limited to the examples shown in FIGS. 2 and 3. Where the socket member 5 is made of a resin, the rear ends of the engaging support claw wall 7' each consisting of a metal piece as shown in FIG. 5 are circumferentially spaced from each other. When the socket member 5 is molded, the rear end portions are cast with the rear end of the socket member 5. Where the socket member is made of a metal, the front ends of the engaging support claw walls 7' each consisting of a metal piece in the same way are fixed by crimping the rear end of the socket member 5. As shown in FIG. 6, the rear ends of the metallic engaging support claw walls 7' are coupled together by a resinous material to form the retainer 7, and they are fixed by crimping.

Figure 4:
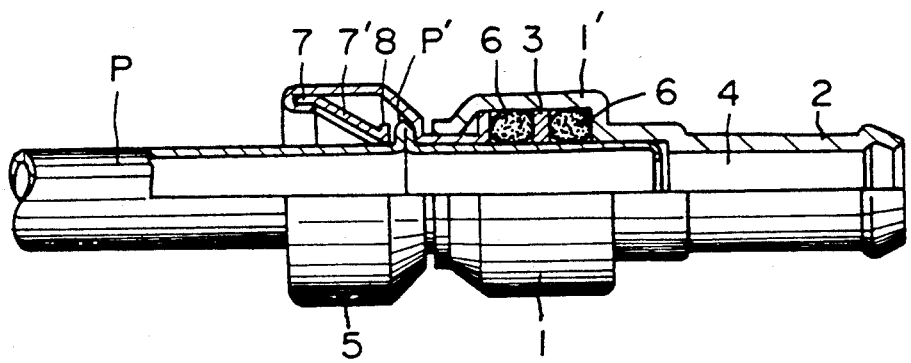
FIG. 4 is a view similar to FIG. 1, but showing another connector according to the invention.
Figure 7A:
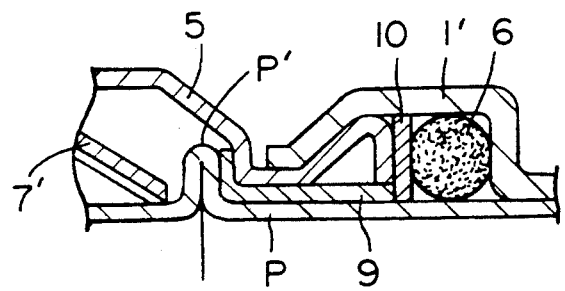
FIGS. 7(A) and 7(B) are fragmentary enlarged cross sections of modifications of the connectors shown in FIGS. 1 and 4, respectively.
Figure 7B:
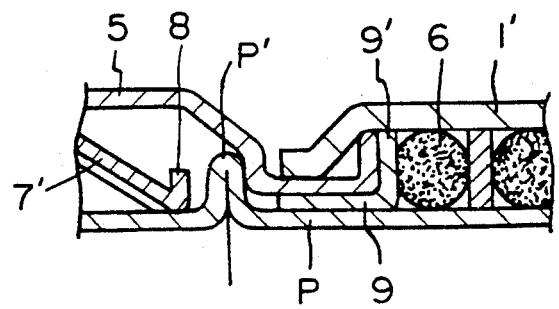
Figure 8:
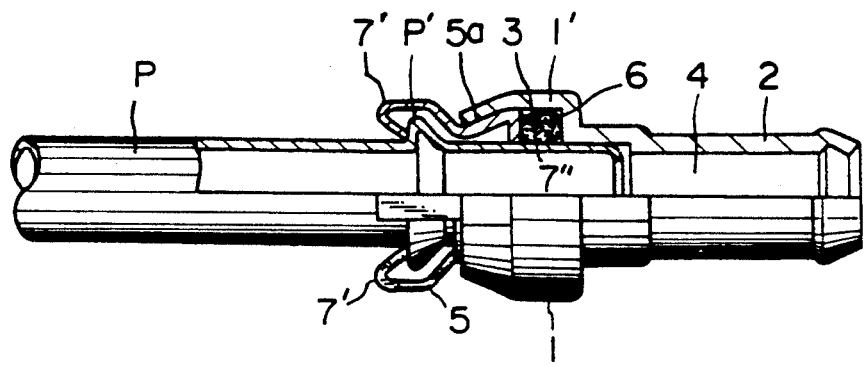
FIG. 8 is a partially cutaway vertical cross section of a yet other connector according to the invention, and in which the connector used to connect a thin tube is connected.
Figure 9:
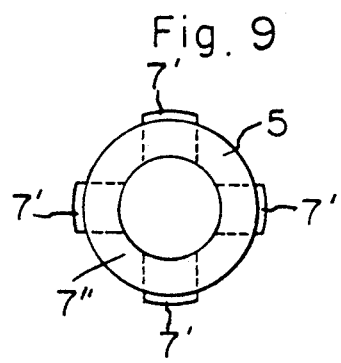
FIG. 9 is a front elevation of the socket member shown in FIG. 8.
Figure 10:
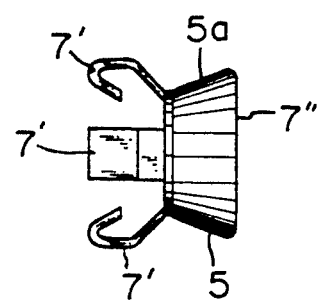
FIG. 10 is a front elevation of the socket member shown in FIG. 9.

A tube P inserted in the enlarged chamber 3 has an outwardly swelling annular wall portion P' near the end of the tube at which it is connected. The annular wall portion P' is placed inside the socket member 5 and engaged by the engaging support claw walls 7' to connect the tube P. The front end portions of the engaging support claw walls 7' of the retainer 7 may be raised outwardly as shown in FIG. 4 to form raised walls 8. As shown in FIG. 7(A), a resinous sleeve 9 can be mounted between the curved surface of the cylindrical wall 1' and the outer surface of the tube P, and a washer 10 can be mounted between the front end of the socket member 5 and the annular seal member 6 to stabilize the seal member. As shown in FIG. 7(B), a sleeve 9 interposed similarly has a flange 9' at its front end. In any of these structures, the outer surface of the tube P is prevented from being damaged by the sleeve 9 when the tube P is inserted.

Other connectors according to the invention are next described by referring to FIGS. 8–12. In these examples, the connector body 1 is identical in structure with the connector bodies of the above examples. The socket member 5 has seal walls 7" which push the annular seal member 6 at their front ends inside the enlarged chamber 3. A plurality of engaging support walls 7' protruding rearwardly from the rear end of the socket member are formed integrally with the socket member. The socket member 5 is provided with a recessed engaging wall portion 5a located at an intermediate location. The vicinities of the rear end of the cylindrical wall 1' forming the enlarged chamber 3 of the connector body 1 are crimped against the engaging wall portion 5a.

Figure 11:
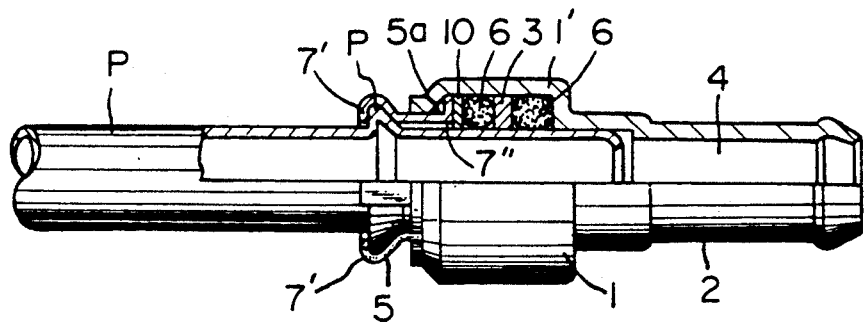
FIG. 11 is a view similar to FIG. 8, but showing a still other connector according to the invention.
Figure 12A:
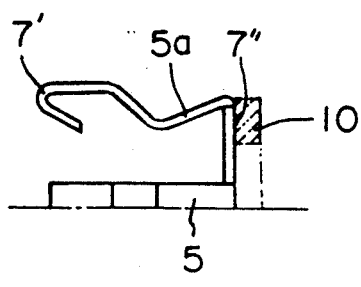
FIG. 12(A) is a fragmentary enlarged partially cutaway view of a still further connector according to the invention.
Figure 12B:
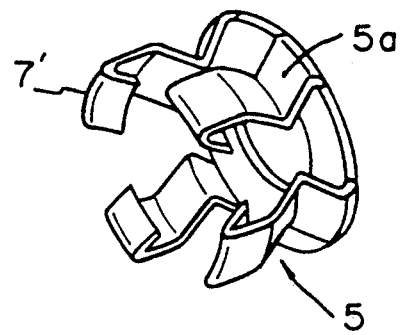
FIG. 12(B) is a perspective view of the connector shown in FIG. 12(A)
Figure 13:
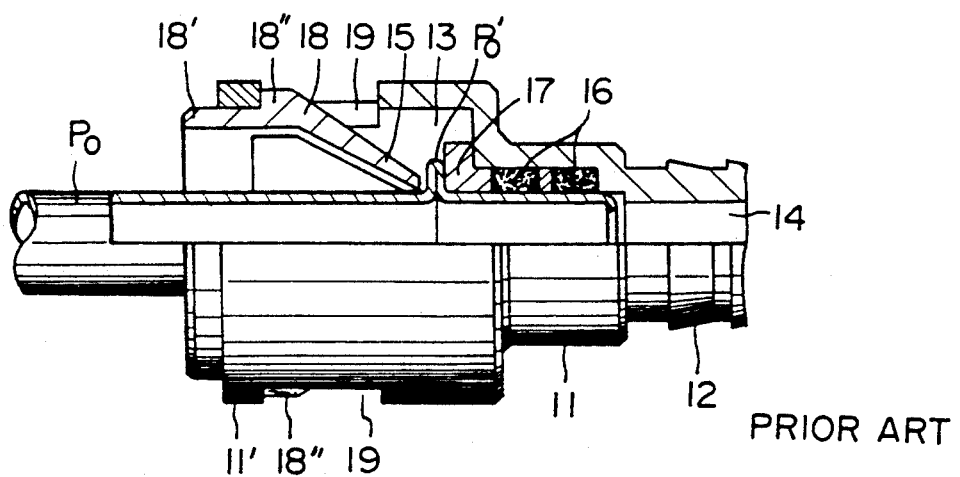
FIG. 13 is a partially cutaway vertical cross section of the prior art connector, and in which the connector is connected.

The socket member 5 can be a cylindrical wall inclined and spreading forward (FIGS. 8–10) or a cylindrical wall having a front end portion that is raised and bent to form a seal wall 7' (FIG. 11). Engaging support claw walls 7' having engaging walls 7 may directly protrude rearward from the outer surface of the seal wall 7" which takes a disklike form (FIGS. 12(A) and 12(B)). In the example of FIG. 12(A), a washer 10 is mounted between the seal wall 7" and the annular seal member 6 to stabilize the seal member 6 in the same way as in FIG. 7(A). The tube P inserted in the enlarged chamber 3 has an outwardly swelling annular wall P' located around the end of the tube at which it is connected. The annular wall P' is connected by the engaging support walls 7' of the socket member 5 so as to be capable of being engaged.

As described thus far, in the novel connector for connecting a thin tube or pipe, the engaging support claw walls 7' protruding rearward from the socket member 5 engaging the connector body 1 make resilient contact with the outwardly swelling wall P' of the tube P. Therefore, the socket member 5 and the tube P can be easily mounted. Also, the diameter and the longitudinal length of the socket member 5 itself can be made small. In addition, the engagement is stable, since the engaging support wall portions 7' engage the swelling annular wall P'. Furthermore, the diameter of the swelling wall can be reduced. Moreover, the possibility that the swelling wall becomes fatigued is eliminated. Rather, a constant engaging force is produced. The connection can be maintained with certainty for a long time. Hence, the whole product including the connector body 1 can be rendered compact. It can be installed in a narrow space. Further, the validity of the engagement can be visually checked with ease, because the portions of the swelling wall P' which are engaged by the engaging support claw walls 7' are located outside the connector body 1. In this way, the connector for connecting a thin tube or pipe is quite useful.

What is claimed is:

1. A connector for connecting to an end of a thin tube having an outwardly swelling annular wall formed around the tube in proximity to the end at which the tube is connected, said connector comprising:
    a connector body having opposed front and rear ends, a cylindrical wall extending rearwardly from the front end and a communication hole extending axially through the cylindrical wall, a stepped enlarged chamber extending axially into the rear end and communicating with the communication hole formed in the cylindrical wall, the rear end of the connector body being characterized by an inwardly extending wall defining a reduced diameter entry to the enlarged chamber;
    at least one annular seal member mounted in the enlarged chamber and dimensioned to sealingly engage around the tube and said enlarged chamber;
    a socket having opposed front and rear ends, a push member being defined at the front end of the socket, the push member being retained in the enlarged chamber by the inwardly extending wall of the connector body and being dimensioned to push the annular seal member forwardly in the enlarged chamber, a recessed member intermediate the front and rear ends of the socket and engaging with the inwardly extending wall of the enlarged chamber, the recessed member being dimensioned to slidingly receive the tube therein, and engaging support members protruding radially inwardly from the rear end of the socket, the engaging support members being engageable with the outwardly swelling annular wall of the tube when the outwardly swelling annular wall of the tube is urged forwardly into the connector and against the recessed member of the socket, whereby the inwardly extending wall prevents removal of the socket from the connector body, and whereby the engaging support members prevent removal of the tube from the socket.

2. The connector of claim 1, wherein said push member is a cylindrical member located at the front end of the member.

3. The connector of claim 2, wherein a sleeve is mounted between the cylindrical member and the outer surface of the tube.

4. The connector of claim 1, wherein said rear end of the socket is defined by a generally cylindrically wall dimensioned to receive the outwardly swelling annular wall of the tube therein, the engaging support members comprise a plurality of engaging support members protruding forward and having rear end portions rigidly fixed to the generally cylindrical wall at the rear end of the socket.

5. The connector of claim 4, wherein said engaging support members comprise engaging support claw walls formed integrally with a retainer.

6. The connector of claim 4, wherein said engaging support members comprise engaging support claw walls crimped against the socket member.

7. The connector of claim 4, wherein said engaging support members comprise engaging support claw walls made from at least one metal spring material and has a front end portion raised outwardly.

8. The connector of claim 1, wherein said socket spreads radially outwardly from the recessed member thereof to the front end, and wherein the front end is bent inwardly to define the push member.

9. The connector of claim 1, wherein the recessed member of said socket defines a generally cylindrical wall, and wherein the front end of the socket is being radially outwardly from the cylindrical wall of the recessed member.

10. The connector of claim 1, wherein said push member consists of a seal washer disposed around the front end of the socket for pushing and stabilizing the seal member.

11. The connector of claim 1, wherein said recessed member consists of a plurality of claw walls passing through the inwardly extending wall of the connector body and surrounding the tube.

12. The connector of claim 1, wherein the at least one annular seal member comprises a plurality of annular seal members and further comprising spacers intermediate the respective seal members.

13. The connector of claim 1, wherein said engaging support members comprise engaging support claw walls integral with the socket and projecting inwardly and forwardly from the rear end of the socket for engaging the outwardly swelling annular wall of the tube.

14. A connector for connecting to an end of a thin tube having an outwardly swelling annular wall formed around the tube in proximity to the end at which the tube is connected, said connector comprising:
- a connector body having opposed front and rear ends, a cylindrical wall extending rearwardly from the front end and a communication hole extending axially through the cylindrical wall, a stepped enlarged chamber extending axially into the rear end and communicating with the communication hole formed in the cylindrical wall, the rear end of the connector body being characterized by an inwardly extending wall defining a reduced diameter entry to the enlarged chamber;
- at least one annular seal member mounted in the enlarged chamber and dimensioned to sealingly engage around the tube and said enlarged chamber;
- a generally cylindrical socket having opposed front and rear ends, the front end being inside the enlarged chamber and pushing the seal member forwardly therein, the inwardly extending wall at the rear end of the enlarged chamber of the connector body engaging the front end of the socket to secure the socket in the connector body; and
- the rear end of the socket being rearward of the connector body and including a plurality of engaging support members protruding forward from the rear end of the socket, the engaging support members connecting with the outwardly swelling annular wall of the tube upon insertion of the tube inside the socket and inside the enlarged chamber of the connector body, whereby the inwardly extending wall prevents removal of the socket from the connector body, and whereby the engaging support members prevent removal of the tube from the socket.

15. A connector for connecting to an end of a thin tube having an outwardly swelling annular wall formed around the tube in proximity to the end at which the tube is connected, said connector comprising:
- a connector body having opposed front and rear ends, a cylindrical wall extending rearwardly from the front end and a communication hole extending axially through the cylindrical wall, a stepped enlarged chamber extending axially into the rear end and communicating with the communication hole formed in the cylindrical wall, the rear end of the connector body being characterized by an inwardly extending wall defining a reduced diameter entry to the enlarged chamber;
- at least one annular seal member mounted in the enlarged chamber and dimensioned to sealingly engage around the tube and said enlarged chamber;
- a socket having opposed front and rear ends, the front end being retained in the enlarged chamber of the connector body by the inwardly extending wall, the front end of the socket comprisng a seal wall that pushes the seal member forwardly inside the enlarged chamber, the socket further including an engaging wall portion engaging with the inwardly extending wall formed by the enlarged chamber near the end thereof thereby retaining the front end of the said socket in said enlarged chamber engaging support claw walls extending rearwardly from the rear end thereof and protruding radially inwardly from the rear end of the socket, the claw walls being dimensioned for connecting with the annular outwardly swelling wall of the tube inserted in the enlarged chamber whereby the inwardly extending wall prevents removal of the socket from the connector body, and whereby the engaging support members prevent removal of the tube from the socket.

* * * * *